United States Patent [19]
Wiek

[11] 3,809,015
[45] May 7, 1974

[54] ANIMAL TREATING DEVICE
[75] Inventor: Claus Wiek, Bieber, Germany
[73] Assignee: Rheintechnik Weiland & Kaspar OHG, Bandorf, Germany
[22] Filed: Mar. 1, 1973
[21] Appl. No.: 337,215

[52] U.S. Cl. ............................................. 119/126
[51] Int. Cl............................................ A01k 15/00
[58] Field of Search ............ 119/126, 127, 128, 96; 54/71, 72

[56] References Cited
FOREIGN PATENTS OR APPLICATIONS
392,977  11/1965  Switzerland
59,782  1/1913  Germany Primary Examiner—Hugh R. Chamblee
Attorney, Agent, or Firm—Michael S. Striker

[57] ABSTRACT

A device to be used for the treatment of animal claws has a strap which is secured to a support. In use, the strap encircles the leg of the animal and bears against the Achilles tendon so that when the strap is initially tightened the leg of the animal is forced against the support. Further tightening of the strap causes pressure to be exerted against the Achilles tendon so that the animal raises its leg for treatment.

13 Claims, 2 Drawing Figures

PATENTED MAY 7 1974

3,809,015

3,809,015

ANIMAL TREATING DEVICE

BACKGROUND OF THE INVENTION

The invention relates generally to the treatment and care of animals, especially larger animals. More particularly, the invention relates to a device which may be used for the treatment and care of the hoofs and claws of such animals.

It is known that the paws or hoofs of animals may become painful under certain circumstances and that brittle and cracked claws may also be a source of irritation. In such cases it is desirable to treat the animal. This may require that the painful hoof of the animal be lifted from the ground in order to facilitate treatment which, however, especially where larger animals are concerned, may be difficult to accomplish. One instance where it is particularly desirable to treat animals having painful hoofs is in the case of cows. Cows having painful hoofs, or cows whose claws are brittle or cracked, are difficult to milk since they will tend to move around. Moreover, such cows do not eat well and this is reflected in lowered milk production and by the fact that these cows do not fatten properly. Thus, it is desirable to have a device which may be conveniently used and which facilitates the treatment of the hoofs of animals.

SUMMARY OF THE INVENTION

Accordingly, it is an object of the invention to provide a device for use in the treatment and care of animal paws and hoofs.

Another object of the invention is to provide a device for use in the treatment and care of animal paws and hoofs which allows the treatment to be performed effectively and easily.

A further object of the invention is to provide a device for use in the treatment and care of animal paws and hoofs which may be employed quickly and conveniently.

An additional object of the invention is to provide a device for use in the treatment and care of animal paws and hoofs which may be uniformly fitted to the leg of the animal regardless of the species of animal being treated.

Yet another object of the invention is to provide a device for use in the treatment and care of animal paws and hoofs which is readily detachable from the leg of the animal and the releasing mechanism of which is extremely reliable so as to insure detachment of the device in case of danger to the animal.

It is also an object of the invention to provide a device for use in the treatment and care of animal paws and hoofs which becomes detached from the leg of the animal when the animal lies down.

In order to attain these and other objects, the invention provides a device, particularly for use in the treatment and care of animal hoofs and the like, which comprises pressure-exerting means adapted to embrace, at least in part, the leg of an animal. The pressure-exerting means is adapted to exert pressure on the Achilles tendon of the animal. Operating means is provided for operating the pressure-exerting means. The pressure exerted on the Achilles tendon causes the animal to raise its leg for treatment.

By using the device of the invention, it becomes possible for a veterinarian, a farmer or a person specializing in the treatment of animal paws and hoofs to work on the animal without assistance.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF THE PREFERRED EMBODIMENTS

Figure 1:
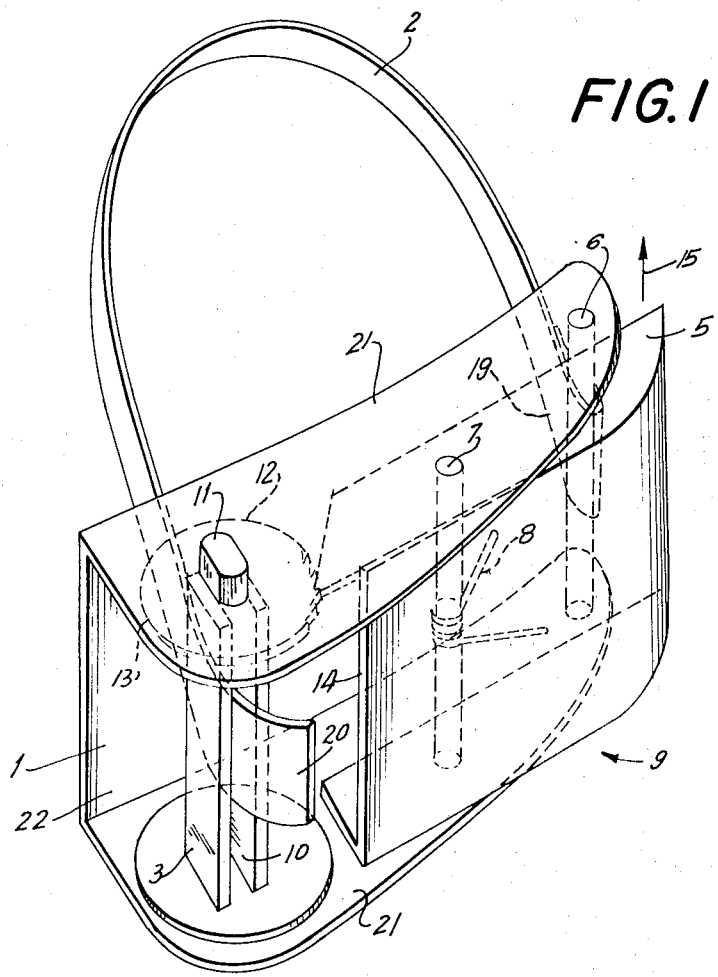
FIG. 1 is a perspective view of a device according to the invention.

Referring to FIG. 1, a device according to the invention is shown generally at 9. The device includes a support 1 on which are mounted a rotatable shaft 3 and a support rod 6 spaced therefrom and extending substantially parallel thereto. The shaft 3 is adapted to rotate about an axis extending parallel to its elongation and through its center. The shaft 3 is provided with a passage 10 which is elongated along the elongation of the shaft 3 or, in other words, which is elongated along the axis of rotation of the shaft 3. One or both end portions 11 of the shaft 3 project beyond the support 1 so as to be exposed. Mounted on the shaft 3 for rotation therewith, and located inwardly of at least one of the end portions 11 is a ratchet wheel 12 having a periphery or peripheral portion at least part of which is provided with teeth. The ratchet wheel 12 is so positioned that its major surfaces 13 lie in planes substantially normal to the axis of rotation of the shaft 3, i.e., the ratchet wheel 12 is located in a plane substantially normal to the axis of rotation of the shaft 3.

A pawl 5 is mounted on the support 1 for pivotal movement about an axis 7 extending substantially parallel to the shaft 3 and the support rod 6. The pivot axis 7 of the pawl 5 is here shown as being located between the shaft 3 and the support rod 6. In its operative position, the pawl 5 engages the ratchet wheel 12 or, rather, the edge or edge portion 14 of the pawl 5 engages the teeth of the ratchet wheel 12. As a result, the shaft 3 will be free to rotate in one sense but will be prevented from rotating in the opposite sense. When the pawl 5 is pivoted about the pivot axis 7 in the direction indicated by the arrow 15, the pawl 5 will be displaced from its operative position and will disengage from the ratchet wheel 12. Biasing means, here shown as a spring clip or spring 8, is mounted on the pivot axis 7 and serves to bias the pawl 5 towards its operative position. This assures that the pawl 5 firmly engages the ratchet wheel 12 when the pawl 5 is in its operative position.

Figure 1A:
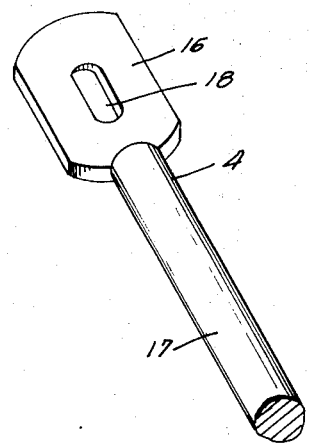
FIG. 1A shows a rod adapted to facilitate operation of the device of FIG. 1.

FIG. 1A shows an elongated rod 4 having an end or end portion 16 and a shank or shank portion 17. The shank 17 is here shown as being substantially cylindrical whereas the end 16 is flattened so as to have a plate-like shape. The end 16 of the rod 4 is provided with a slot 18 which is elongated along the elongation of the rod 4. The slot 18 is adapted to mate with the end 11 of the shaft 3. This allows a substantial amount of torque to be exerted on the shaft 3.

The elements described thus far are part of the operating means of the device 9.

Referring again to FIG. 1, it is seen that the device 9 is provided with pressure-exerting means in the form of a strap 2. One end or end portion 19 of the strap 2 is secured to the support rod 6. The other end or end portion 20 of the strap 2 is free and is adapted to extend into and be retained in the passage 10 provided in the shaft 3. Thus, when the shaft 3 is rotated, it acts like a reel thereby tending to shorten the strap 2.

In the embodiment shown, the support 1 includes two substantially parallel walls or wall portions 21 and a transverse wall or wall portion 22 fast with the respective walls 21. The transverse wall 22 may terminate short of the support rod 6 and may be provided with an opening in the region of the shaft 3 for passage therethrough of the strap 2. The shaft 3, the support rod 6 and the pivot axis 7 are all elongated in a direction substantially normal to the walls 21 and are all supported thereby.

In operation, the support 1 is placed adjacent to that leg of the animal which is to be treated. The entire device 9 is so positioned that the strap 2 is at a height which corresponds to that of the Achilles tendon of the animal. The strap 2 is then brought around the leg of the animal so as to embrace or encircle the same and the end 20 of the strap 2 is then inserted into the passage 10 provided in the shaft 3. The width of the strap 2 need not be such as to embrace the entire leg of the animal, the primary criterion being that the strap 2 be able to exert pressure against the Achilles tendon of the animal. The shaft 3 is now rotated, by hand if desired, thereby reeling up the strap 2 and shortening it so that the leg of the animal is forced into contact with the support 1. This is continued until a resistance is felt. The rod 4 is now taken and the slot 18 thereof is fitted onto the end portion 11 of the shaft 3 so as to embrace the same. Rotation of the rod 4 and, consequently, of the shaft 3, shortens the strap 2, which bears against the Achilles tendon, thereby still further increasing the pressure on the Achilles tendon. When the pressure has been increased sufficiently, the animal will raise its leg automatically. The animal is now ready for treatment. During the tightening operation and during treatment, the pawl 5 remains in its rest position so that it engages the ratchet wheel 12 and prevents rotation of the shaft 3 in a sense loosening the strap 2. The spring 8 assures that the pawl 5 remains in firm engagement with the ratchet wheel 12 by virtue of its biasing action. Upon completion of the treatment, the pawl 5 is pivoted about the pivot axis 7 in the direction of the arrow 15 so that it becomes disengaged from the ratchet wheel 12. This action permits the strap 2 to become loosened so that the leg of the animal may be removed from the device 9. The rod 4 is preferably removed from the shaft 3 prior to disengagement of the pawl 5 from the ratchet wheel 12.

The device of the invention may be made of any suitable materials such as metals or alloys thereof, wood, plastics and the like as may the rod of FIG. 1A. Similarly, the strap may be made of any materials which suit the application such as fabrics, plastics, rubber and the like. The device may be molded so that it is integral or may be produced from discrete elements which are then connected by any suitable attachment means such as welding, brazing, soldering, bolting, screwing, adhesion and the like and, obviously, the strap may be secured to the support by means such as these rather than in the manner shown. Pressure-exerting and retaining means other than the ratchet wheel-pawl combination may also be used. The biasing means need not be a spring but may consist of any elastic medium, for example, a pre-compressed plug of rubber or the like. Furthermore, the objectives of the invention which include, among others, applying pressure to the Achilles tendon of the animal so as to cause the animal to raise its leg for treatment, may be obtained by means other than that described, e.g., by using a modified form of the so-called hose clamps.

It will be understood that each of the elements described above, or two or more together, may also find a useful application in other types of construction and uses differing from the types described above.

While the invention has been illustrated and described as embodied in an animal treating device, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art fairly constitute essential characteristics fo the generic or specific aspects of this invention and, therefore, such adaptations should and are intended to be comprehended within the meaning and range of equivalence of the following claims.

What is claimed as new and desired to be protected by Letters Patent is set forth in the appended

1. A device of the character described, particularly for use in the treatment and care of animal hoofs and the like, comprising an elongated flexible element adapted to at least in part embrace the leg of an animal and to exert pressure on the Achilles tendon of the leg; and operating means for operating said flexible element to thereby cause the latter to exert sufficient pressure on the Achilles tendon so that the animal raises its leg for treatment, said operating means comprising a rotatable take-up element having a coupling portion adapted to engage said flexible element, whereby rotation of said take-up element when said coupling portion engages said flexible element causes a reduction in the effective length of the latter and exertion of pressure on the Achilles tendon.

2. A device as defined in claim 1, wherein said flexible element comprises a strap.

3. A device as defined in claim 1, wherein said operating means comprises a support adapted to abut the leg of the animal at least when said flexible element exerts pressure against the Achilles tendon.

4. A device as defined in claim 1, wherein said operating means further comprises a rotation-preventing element having an operative position in which it cooperates with said take-up element so as to prevent rotation of the latter in a sense causing an increase in the effective length of said flexible element.

5. A device as defined in claim 4, said operating means further comprising biasing means for biasing said rotation-preventing element towards said operative position; and wherein said rotation-preventing element is mounted for movement in a direction away from said operative position in response to a predetermined force exerted in a sense opposing said biasing means, whereby to permit rapid loosening of said flexible element.

6. A device of the character described, comprising a strap adapted to at least in part embrace the leg of an animal and to exert pressure on the Achilles tendon of the leg, said strap having an end portion; and operating means for operating said strap so that the pressure exerted on the Achilles tendon causes the animal to raise its leg for treatment, said operating means comprising a support adapted to abut the leg of the animal at least when said strap exerts pressure against the Achilles tendon, a shaft rotatably mounted on said support, a ratchet wheel located in a plane substantially normal to the axis of rotation of said shaft mounted on the latter for rotation therewith, and a pawl having an operative position in which it engages said ratchet wheel, said end portion being adapted to be secured to said shaft, whereby rotation of said shaft when said end portion is secured thereto causes a reduction in the effective length of said strap and exertion of pressure against the Achilles tendon thereby forcing the leg of the animal against said support, said pawl preventing rotation of said shaft in a sense loosening said strap when said pawl is in said operative position.

7. A device as defined in claim 6, wherein said operating means further comprises a support rod mounted on said support, said support rod being spaced from and extending substantially parallel to said shaft, said strap having another end portion adapted to be secured to said support rod, said pawl being mounted for pivotal movement about an axis extending substantially parallel to said shaft and said support rod and located therebetween, said pawl being adapted to disengage from said ratchet wheel when pivoted from said operative position so as to permit loosening of said strap, and biasing means biasing said pawl towards said operative position.

8. A device as defined in claim 6, wherein said pawl is mounted for pivotal movement about an axis substantially parallel to said shaft.

9. A device as defined in claim 8, wherein said pawl is adapted to disengage from said ratchet wheel when pivoted from said operative position so as to permit loosening of said strap, and said operating means comprising biasing means biasing said pawl towards said operative position.

10. A device as defined in claim 9, wherein said biasing means comprises at least one spring.

11. A device of the character described, comprising a strap adapted to at least in part embrace the leg of an animal and to exert pressure on the Achilles tendon of the leg, said strap having an end portion; and operating means for operating said strap so that the pressure exerted on the Achilles tendon causes the animal to raise its leg for treatment, said operating means comprising a support adapted to abut the leg of the animal at least when said strap exerts pressure against the Achilles tendon, and a shaft rotatably mounted on said support and being provided with a passage elongated along the axis of rotation thereof, said end portion being adapted to extend into and be retained in said passage, whereby rotation of said shaft when said end portion extends into and is retained in said passage causes a reduction in the effective length of said strap and exertion of pressure against the Achilles tendon thereby forcing the leg of the animal against said support.

12. A device of the character described, comprising a strap adapted to at least in part embrace the leg of an animal and to exert pressure on the Achilles tendon of the leg, said strap having two end portions; and operating means for operating said strap so that the pressure exerted on the Achilles tendon causes the animal to raise its leg for treatment, said operating means comprising a support adapted to abut the leg of the animal at least when said strap exerts pressure against the Achilles tendon, a shaft rotatably mounted on said support, and a support rod mounted on said support and being spaced from and extending substantially parallel to said shaft, one of said end portions being adapted to be secured to said support rod, and the other of said end portions being adapted to be secured to said shaft, whereby rotation of said shaft when said one end portion is secured to said support rod and said other end portion is secured to said shaft causes a reduction in the effective length of said strap and exertion of pressure against the Achilles tendon thereby forcing the leg of the animal against said support.

13. A device of the character described, comprising a strap adapted to at least in part embrace the leg of an animal and to exert pressure on the Achilles tendon of the leg, said strap having an end portion; and operating means for operating said strap so that the pressure exerted on the Achilles tendon causes the animal to raise its leg for treatment, said operating means comprising a support adapted to abut the leg of the animal at least when said strap exerts pressure against the Achilles tendon, a shaft having an exposed end portion rotatably mounted on said support, and an elongated rod having an end section adapted to mate with said exposed end portion so as to facilitate rotation of said shaft, said end portion of said strap being adapted to be secured to said shaft, whereby rotation of said shaft when said end portion of said strap is secured thereto causes a reduction in the effective length of said strap and exertion of pressure against the Achilles tendon thereby forcing the leg of the animal against said support.

* * * * *

UNITED STATES PATENT OFFICE
CERTIFICATE OF CORRECTION

Patent No. 3 809 015                  Dated May 7, 1974

Inventor(s) Claus Wiek

It is certified that error appears in the above-identified patent and that said Letters Patent are hereby corrected as shown below:

In the heading insert

(30) Foreign application priority date

March 2, 1972, Germany P 22 09989.4

Signed and sealed this 18th day of February 1975.

(SEAL)
Attest:

RUTH C. MASON
Attesting Officer

C. MARSHALL DANN
Commissioner of Patents
and Trademarks